(12) United States Patent
Atwood et al.

(10) Patent No.: US 7,220,798 B2
(45) Date of Patent: May 22, 2007

(54) PROCESS FOR PREPARING BLOCK COPOLYMER AND RESULTING COMPOSITION

(75) Inventors: Harvey E. Atwood, Kingwood, TX (US); Robert C. Bening, Katy, TX (US); Mark Hageman, Amsterdam (NL); Dale L. Handlin, Jr., Houston, TX (US); Adrie A. van der Huizen, Amsterdam (NL); Kimberly A. Johnson, Richmond, TX (US); Carl L. Willis, Houston, TX (US)

(73) Assignee: Kraton Polymers US LLC, Houston, TX (US)

( * ) Notice: Subject to any disclaimer, the term of this patent is extended or adjusted under 35 U.S.C. 154(b) by 0 days.

(21) Appl. No.: 11/068,557

(22) Filed: Feb. 28, 2005

(65) Prior Publication Data

US 2005/0154144 A1    Jul. 14, 2005

Related U.S. Application Data

(62) Division of application No. 10/454,237, filed on Jun. 4, 2003.

(51) Int. Cl.
   *C08F 297/04*   (2006.01)
(52) U.S. Cl. ............. 525/105; 525/314; 525/342; 526/340.2; 526/340.4; 526/335; 522/80; 522/149
(58) Field of Classification Search ........... 525/342, 525/105, 314; 526/335, 340.2, 340.4; 522/80, 522/149
   See application file for complete search history.

(56) References Cited

U.S. PATENT DOCUMENTS

| | | |
|---|---|---|
| 3,149,182 A | 9/1964 | Porter |
| 3,244,664 A | 4/1966 | Zelinski et al. |
| 3,281,383 A | 10/1966 | Zelinski et al. |
| 3,494,942 A | 2/1970 | Miki et al. |
| RE27,145 E | 6/1971 | Jones |
| 3,594,452 A | 7/1971 | De La Mare et al. |
| 3,595,942 A | 7/1971 | Wald et al. |
| 3,634,594 A | 1/1972 | Hiyama |
| 3,670,054 A | 6/1972 | De La Mare et al. |
| 3,692,874 A | 9/1972 | Farrar et al. |
| 3,700,633 A | 10/1972 | Wald et al. |
| 3,766,301 A | 10/1973 | De La Mare et al. |
| 3,880,954 A | 4/1975 | Kahle et al. |
| 3,985,830 A | 10/1976 | Fetters et al. |
| 4,076,915 A | 2/1978 | Trepka |
| 4,104,326 A | 8/1978 | Fodor |
| 4,104,332 A | 8/1978 | Zelinski |
| 4,185,042 A | 1/1980 | Verkouw |
| 4,379,891 A * | 4/1983 | Haynes ............. 525/342 |
| 4,408,017 A | 10/1983 | Martin |
| 4,987,194 A | 1/1991 | Maeda et al. |
| 5,075,377 A | 12/1991 | Kawabuchi et al. |
| 5,266,649 A | 11/1993 | Balas et al. |
| 5,272,214 A | 12/1993 | Custro et al. |
| 5,399,627 A | 3/1995 | Diehl et al. |
| 5,420,203 A | 5/1995 | Dillman et al. |
| 5,486,574 A | 1/1996 | Himes et al. |
| 5,532,319 A | 7/1996 | Asahara et al. |
| 5,552,493 A | 9/1996 | Spence et al. |
| 5,681,895 A | 10/1997 | Bening et al. |
| 5,777,039 A * | 7/1998 | De Craene et al. ......... 525/314 |
| 6,723,686 B2 | 4/2004 | Calle et al. |
| 6,833,411 B2 | 12/2004 | Fujiwara et al. |
| 6,838,538 B2 * | 1/2005 | Toyoizumi et al. ......... 526/336 |
| 6,852,806 B2 * | 2/2005 | Sasagawa et al. ....... 525/332.9 |

FOREIGN PATENT DOCUMENTS

| | | |
|---|---|---|
| CN | 1073950 | 7/1993 |
| CN | 1241582 | 1/2000 |
| EP | 0 404 185 A2 | 6/1990 |
| EP | 0 541 180 A2 | 5/1992 |
| EP | 0 669 350 A1 | 2/1995 |
| EP | 0 745 635 A1 | 5/1996 |
| EP | 1 233 028 A1 | 8/2002 |
| JP | 06-279744 | 10/1994 |
| JP | 07-238207 | 9/1995 |
| JP | 2001310988 | 11/2001 |
| JP | 2004/131707 | 4/2004 |

(Continued)

OTHER PUBLICATIONS

Related U.S. Appl. No. 10/454,237 filed Jun. 4, 2003 claiming priority to U.S. Appl. No. 60/385,663 filed Jun. 4, 2002.

(Continued)

*Primary Examiner*—Robert D. Harlan
(74) *Attorney, Agent, or Firm*—Donna B. Holguin

(57) ABSTRACT

Lithium-terminated polymers of one or more conjugated dienes and of one or more mono alkenyl arenes are coupled by reaction with an alkoxy silane coupling agent having the formula $R_x$—Si—$(OR')_y$, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals, such that the resulting polymer composition contains less than about ten weight percent of uncoupled polymer diblock. The polymer compositions are subsequently selectively hydrogenated, and are useful in a variety of compounds and end use applications.

29 Claims, 1 Drawing Sheet

FOREIGN PATENT DOCUMENTS

| | | |
|---|---|---|
| WO | 92/20725 | 11/1992 |
| WO | 01/23437 A1 | 4/2001 |
| WO | 02/057386 | 7/2002 |
| WO | 03/066697 A1 | 8/2003 |

OTHER PUBLICATIONS

Related U.S. Appl. No. 10/453,993 filed Jun. 4, 2003 (now U.S. Pat. No. 7,001,956) claiming priority to U.S. Appl. No. 60/385663 filed Jun. 4, 2002.

* cited by examiner

PROCESS FOR PREPARING BLOCK COPOLYMER AND RESULTING COMPOSITION

CROSS-REFERENCE TO RELATED APPLICATIONS

The present application is a divisional of U.S. patent application Ser. No. 10/454,237, filed Jun. 4, 2003, entitled Process for Preparing Block Copolymer and Resulting Composition.

BACKGROUND OF THE INVENTION

1. Field of the Invention

This invention relates to the coupling of anionic polymers and to the hydrogenation of such coupled polymers to make a polymer composition containing low levels of uncoupled polymer and a mixture of linear and radial polymers.

2. Background of the Art

The coupling of lithium-terminated polymers is a process known in the art. In accordance with this known process, a lithium-terminated polymer is treated with a compound having two or more functional groups containing two or more reactive sites capable of reacting with the carbon-lithium bonds of the lithium-terminated polymer. In many cases the multifunctional coupling agent thereby becomes a nucleus for the resulting structure. From this nucleus long chain polymeric branches radiate and such coupled polymers have specific properties that render them useful for particular applications.

Linear polymers are formed by employing coupling agents having two reactive sites. For example, one coupling agent employed in making linear polymers is methyl benzoate as disclosed in U.S. Pat. No. 3,766,301. Radial polymers are formed by employing coupling agents having more than two reactive sites. Examples of such coupling agents include among others silica compounds, including silicon tetrachloride and alkoxy silanes—U.S. Pat. Nos. 3,244,664, 3,692,874, 4,076,915, 5,075,377, 5,272,214 and 5,681,895; polyepoxides, polyisocyanates, polyimines, polyaldehydes, polyketones, polyanhydrides, polyesters, polyhalides—U.S. Pat. No. 3,281,383; diesters—U.S. Pat. No. 3,594,452; methoxy silanes—U.S. Pat. No. 3,880,954; divinyl benzene—U.S. Pat. No. 3,985,830; 1,3,5-benzenetricarboxylic acid trichloride—U.S. Pat. No. 4,104,332; glycidoxytrimethoxy silanes—U.S. Pat. No. 4,185,042; and oxydipropylbis(trimethoxy silane)—U.S. Pat. No. 4,379,891.

The production of styrenic block copolymers such as S-E/B-S triblocks by coupling has a number of process advantages over sequential polymerization, such as better control over the styrene block size and lower viscosity during polymerization. However, the inevitable presence of un-coupled arms can limit product performance. Diblock contamination can greatly reduce tensile strength and related properties in a triblock copolymer or compound thereof. S-E/B-S polymers for use in applications such as highly-oiled compounds cannot afford to sacrifice in this area. It is generally difficult to achieve coupling efficiencies of better than 90%. While coupling efficiencies on the order of 90% can be achieved by reaction with m-divinylbenzene, the resulting products are high molecular weight "star" polymers. Although the melt viscosity of such a polymer is much lower than a linear product of the same total molecular weight, it is much higher than that of the corresponding triblock that would be prepared by coupling two of the diblock arms.

It would be highly desirable to identify a coupling agent that gives greater than 90% of a substantially linear product, or, at least, a mixture of linear and radial polymers. It would be particularly advantageous if coupling efficiencies approaching 95% could be obtained in systems that result in a butadiene microstructure suitable for hydrogenation to give a saturated rubber block. Such products would be expected to have properties that are comparable to sequentially polymerized S-E/B-S polymers, which are often contaminated with some diblock due to a variety of side reactions. It would also be highly advantageous if residual coupling agent or its by-products were found to have no adverse affect on the activity of the hydrogenation catalyst.

SUMMARY OF THE INVENTION

The present invention broadly encompasses a process for making a hydrogenated block copolymer, comprising the steps of: a. reacting a living lithium-terminated polymer having the formula P-Li where P is a copolymer chain of one or more conjugated dienes having 4 to 12 carbon atoms and one or more mono alkenyl arenes having 8 to 18 carbon atoms with an alkoxy silane coupling agent having the formula $R_x$—Si—$(OR')_y$, where x is 0 or 1, x+y=4, R is selected from aryl, linear alkyl and branched alkyl hydrocarbon radicals, and R' is selected from linear and branched alkyl hydrocarbon radicals, and where the molar ratio of Si to Li is between about 0.35 and about 0.7, thereby forming a coupled polymer; b. optionally hydrogenating the coupled polymer under hydrogenation conditions of a catalyst, time, temperature and pressure effective to substantially saturate at least the olefinically derived double bonds of said coupled polymer without substantial degradation of the coupled polymer; and c. recovering the resulting polymer.

The present invention also encompasses the resulting block copolymers made using the alkoxy silanes of the process. In particular, the present invention includes a block copolymer composition comprising: a. a tetra-branched block copolymer (IV) having a number average molecular weight of 100,000 to 800,000 represented by the general formula $(A-B)_4X$; b. a tri-branched block copolymer (III) having a number average molecular weight of 75,000 to 600,000 represented by the general formula $(A-B)_3X$; c. a di-branched block copolymer (II) having a number average molecular weight of 50,000 to 400,000 represented by the general formula $(A-B)_2X$; and d. a linear diblock copolymer (I) having a number average molecular weight of 25,000 to 200,000 represented by the general formula A-B; where: i) A represents a polymer block of a mono alkenyl arene; ii) B represents a polymer block of a conjugated diene; iii) X represents the residue of an alkoxy silane coupling agent; and iv) the relative amounts of copolymers I, II, III and IV are 0 to 5 weight percent IV, 0 to 60 weight percent III, 40 to 95 weight percent II and 2 to 10 weight percent I, where the total of I, II, III and IV equals 100 weight percent. The alkoxy silane coupling agent has the formula $R_x$—Si—(OR')

$_y$, where x is 0 or 1, x+y=4, and R and R' are the same or different, R is selected from aryl hydrocarbon radicals, linear alkyl hydrocarbon radicals and branched alkyl hydrocarbon radicals, and R' is selected from linear or branched alkyl hydrocarbon radicals having 1 to 12 carbon atoms.

Also contemplated by the present invention is a block copolymer composition comprising: a. a tetra-branched block copolymer (IV) having a number average molecular weight of 100,000 to 800,000 represented by the general formula $(C-D-E)_4X$; b. a tri-branched block copolymer (III) having a number average molecular weight of 75,000 to 600,000 represented by the general formula $(C-D-E)_3X$; c. a di-branched block copolymer (II) having a number average molecular weight of 50,000 to 400,000 represented by the general formula $(C-D-E)_2X$; and d. a linear triblock copolymer (I) having a number average molecular weight of 25,000 to 200,000 represented by the general formula C-D-E; where: i) D represents a polymer block of a mono alkenyl arene; ii) E and C represent polymer blocks of a conjugated diene; iii) X represents the residue of an alkoxy silane coupling agent; iv) the weight ratio of polymer block D to polymer block E is from 10:90 to 90:10; and v) the relative amounts of copolymers I, II, III and IV are 0 to 5 weight percent IV, 0 to 60 weight percent III, 40 to 95 weight percent II and 2 to 10 weight percent I, where the total of I, II, III and IV equals 100 weight percent. Still further, rather than a structure (C-D-E)X for the arm, the polymer arm may be (F-G-H)X where F represents a polymer block of a mono alkenyl arene, G represents a polymer block of a conjugated diene, and H represents a polymer block of a different conjugated diene.

The present invention affords a robust process for making highly coupled, saturated (hydrogenated) anionic block copolymers. Excellent coupling efficiencies have been realized over a broad range of coupling agent to living chain end molar ratios. For many coupling agents, careful control of the coupling agent to chain end ratio is required to achieve even minimal levels of coupling. The process of the present invention is remarkably forgiving in this regard.

Coupling efficiency is of critical importance in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled arms dilute the strength forming network of a block copolymer that weakens the material. The very high coupling efficiency realized in the present invention is key to making high strength, coupled, block copolymers.

The melt viscosity of a polymer increases with increasing molecular weight. Low melt viscosity is preferred for ease of melt processing in a polymeric material. The present invention allows an efficient preparation of highly coupled polymer for good strength without excessive formation of highly branched products, which products would contribute to unacceptably high melt viscosities. The present invention affords predominantly two arm and three arm coupled products with small amounts of the strength diluting uncoupled arms and four arm coupled product that contributes to excessive melt viscosity. The use of divinylbenzene, DVB, as a coupling agent for anionic polymers for example cannot be controlled in this way. When DVB is used in a way that gives high levels of coupling, it is common to get 6 to 20 or more arms linked together in a single molecule. The affect of these high molecular weight polymers on melt viscosity is known. The present coupling technology allows the preparation of high strength block copolymers with good melt processing characteristics.

It is desirable to hydrogenate butadiene and isoprene containing polymers to enhance their thermal and oxidative stability. The C=C unsaturation in diene polymers is prone to degradation at high temperatures and in the presence of oxygen.

The hydrogenation of silicon coupled anionic polymers has found to be problematic. A variety of silicon agents outside the scope of the present invention were used to make coupled anionic diene polymers; these polymers were hydrogenated using a number of different standard diene polymer hydrogenation techniques. Degradation of the coupled polymers during hydrogenation was observed. From gel permeation chromatography (GPC) analyses of the degraded products, it appeared as though the coupled polymers were decoupling under the hydrogenation conditions.

With the silicon coupled anionic polymers, the decoupling reaction proceeds to form unlinked arms that erode the strength forming network of the hydrogenated block copolymer. In some examples, most of the product was degraded before the hydrogenation reaction was completed. In the present invention, we have discovered a means for overcoming this problem—it has been found desirable to add an alcohol (such as methanol or 2-ethyl hexanol) after polymerization and prior to hydrogenation. For example, when the simplest member of the family of tetraalkoxy silanes, tetramethoxysilane, has been used as the coupling agent to link diene containing block copolymer arms, the product polymer should be treated with an equivalent of an alcohol (alcohol/P-Li=1 (mol/mol)), such as methanol, for every equivalent of living anionic polymer arm that was in the cement prior to the addition of the coupling agent. The alcohol should be added after coupling and before contacting the coupled polymer cement with the hydrogenation catalyst.

Hydrogenation using a standard Ni/Al, Co/Al or Ti technique under these conditions allowed the formation of a fully saturated polymer with substantially no degradation. The present invention is a process for making hydrogenated, silicon coupled, anionic, diene block copolymers without severe degradation. Alternatively, it has been discovered that higher molecular weight homologues of the tetraalkoxysilane family can be used to prepare highly coupled, anionic diene copolymers that may be hydrogenated with Ni/Al, Co/Al or Ti techniques without serious degradation using far less alcohol than was required for the tetramethoxysilane coupled polymers. The use of coupling agents like tetraethoxysilane and tetrabutoxysilane afforded highly coupled polymers that were not degraded during hydrogenation. These polymers were strong, were readily melt processed, and had excellent thermal and oxidative stability. Likewise, when using trialkoxy silanes such as methyl trimethoxy silane it was found useful to add an alcohol (e.g. 2-ethyl hexanol) after coupling and before contacting with a hydrogenation catalyst in order to avoid any degradation during hydrogenation.

DETAILED DESCRIPTION OF THE PREFERRED EMBODIMENTS

Figure 1:
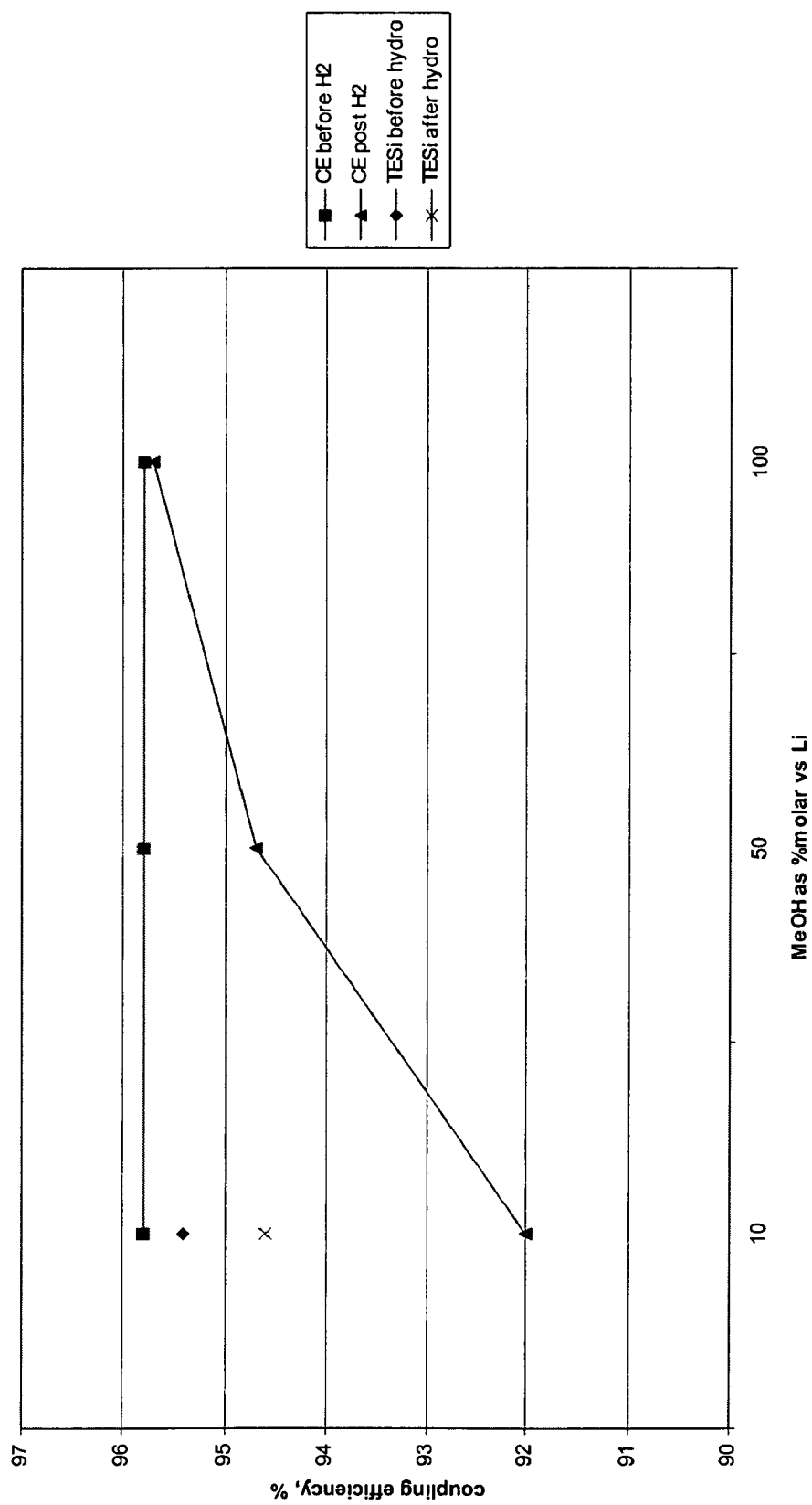
FIG. 1 shows the coupling efficiency after hydrogenation of polymers made with tetramethoxy silane and with tetraethoxy silane as a function of methanol addition prior to hydrogenation.

In one embodiment, the present invention is a process which includes a step of reacting a living lithium-terminated polymer having the formula P-Li where P is a copolymer chain of one or more conjugated dienes having 4 to 12 carbon atoms and one or more mono alkenyl arenes having 8 to 18 carbon atoms with the alkoxy silane coupling agent. The preferred acyclic conjugated dienes that can be polymerized into the polymer chain P of the present invention are those containing 4 to 8 carbon atoms. Examples for such conjugated dienes are 1,3-butadiene (termed "butadiene" in the claims and elsewhere in the specification), 2,3-dimethyl-1,3butadiene, piperylene, 3-butyl-1,3octadiene, isoprene, 2-phenyl-1,3-butadiene.

Mono alkenyl arenes that can be polymerized together with the dienes to form the polymer chain P are preferably those selected from the group of styrene, the methylstyrenes, particularly 3-methylstyrene, the propylstyrenes, particularly 4-propylstyrene, the butyl styrenes, particularly p-t-butylstyrene, vinylnapthalene, particularly 1-vinylnapthalene, cyclohexylstyrenes, particularly 4-cyclohexylstyrene, p-tolylstyrene, and 1-vinyl-5-hexylnaphthalene.

The polymer chains P can be homopolymers of the conjugated diene monomers defined or can be copolymers of diene monomers and mono alkenyl-substituted aromatic monomers. The copolymers, in turn, can be random or tapered copolymers, as well as block copolymers of these various monomers. The presently preferred monomers are isoprene, 1,3-butadiene and styrene. The presently preferred polymer chains P are those where the conjugated dienes are present in a major amount and the mono vinyl-substituted arenes are present in a minor amount. It is preferred that the mono alkenyl arene content be from about 5 to about 50 weight percent of the total block copolymer, more preferably from about 10 to about 35 weight percent.

The preferred polymer of the present invention is one that is obtained by coupling a living lithium-terminated polymer selected from the group consisting of homopolymers of conjugated dienes having from 4 to 12 carbon atoms and copolymers of at least one diene of from 4 to 12 carbon atoms.

Those polymers in which the polymer chain P has a structure A-B- or C-D-E- or F-G-H- so that B or E or H is attached to the coupling agent, and in which A, D and F represents a block of mono alkenyl arenes, preferably a polystyrene block, and B, C, E, G and H represents a block that confers rubbery properties to the polymer chain, such as a poly conjugated diene block, a copolymer block of a conjugated diene and a mono alkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula P-Li and a coupling agent as defined above, wherein Li is lithium and P is as described above.

The quantity of coupling agent employed with respect to the quantity of living polymers P-Li present depends largely upon the degree of coupling and the properties of the coupled polymers desired. Preferably the coupling agent defined above will be employed in a range of from about 0.35 to about 0.7 moles of coupling agent per mole of lithium, P-Li, more preferably from about 0.4 to about 0.55 moles of coupling agent based upon the moles of lithium present in the polymer, P-Li, most preferably about 0.45 moles of coupling agent per mole of lithium, P-Li. At lower silicon coupling agent to lithium chain end molar ratios Si/Li (mol/mol), there is not enough coupling agent present to allow high levels of coupling; the coupling efficiency will start to decline if lower Si/Li molar ratios are employed. Lower levels of coupling will tend to lead to a block copolymer product having less strength; the unlinked arms tend to dilute out the strength forming network in the block copolymer A further problem with using lower Si/Li molar ratios is that at high conversion it will tend to advance the coupling reaction to make higher levels of 4-arm coupled product. The 4-arm coupled product is not preferred as it can contribute to excessive viscosity in the melt which makes melt processing of the product more difficult. Lower Si/Li (mol/mol) ratios are also not preferred because they can lead to weaker products that are more difficult to melt process.

On the other hand, Si/Li (mol/mol) ratios in excess of about 0.7 are also not preferred. At Si/Li (mol/mol)=0.5, there is sufficient coupling agent present to couple all of the chain ends into a linear, 2-arm product; this is the preferred result. Higher levels of Si/Li (mol/mol) only result in the addition of excess coupling agent. The addition of excess reagent contributes added cost to the process without an advantage in the quality of the coupled polymer. At ratios greater than about 0.7, the excess coupling agent will tend to cap living chain ends without linking them together; this will contribute to a decline in coupling efficiency at higher Si/Li molar ratios. Lower coupling efficiency will afford block copolymer products having less strength. The use of Si/Li (mol/mol) ratios in excess of about 0.7 will unnecessarily increase the cost of the process and will afford lower quality coupled polymers.

As stated above, the coupling agent used in the present invention is an alkoxy silane of the general formula $R_x$—Si—$(OR')_y$, where x is 0 or 1, x+y=4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Preferred tetra alkoxy silanes are tetramethoxy silane ("TMSi"), tetraethoxy silane ("TESi"), tetrabutoxy silane ("TBSi"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

The temperature at which the coupling reaction is carried out can vary over a broad range and, for convenience, often is the same as the temperature of polymerization. Although the temperature can vary broadly from about 0° to 150° C., it will preferably be within the range from about 30° C. to 100° C., more preferably about 55° C. to about 80° C.

The coupling reaction is normally carried out by simply mixing the coupling agent, neat or in solution, with the living polymer solution. The reaction period is usually quite short, and can be affected by the mixing rate in the reactor. The normal duration of the coupling reaction will be in the range of 1 minute to 1 hour. Longer coupling periods may be required at lower temperatures.

After the coupling reaction, the linked polymers may be recovered, or if desired they may be subjected to a selective hydrogenation of the diene portions of the polymer. Hydrogenation generally improves thermal stability, ultraviolet light stability, oxidative stability, and weatherability of the final polymer. It is important that the coupling agents not interfere with or otherwise "poison" the hydrogenation catalyst.

Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. These methods operate to hydrogenate polymers containing aromatic or ethylenic unsaturation, and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This hydrogenation can be accomplished in a suitable solvent or diluent at a temperature from about 20° C. to about 60° C., and a pressure of about 2 bars to about 10 bars. Other catalysts that are useful include titanium based catalyst systems and various heterogeneous catalysts.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds have been reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

It has been found, as shown in the comparative example (7774 H2, Table 4) in Example 1 below, that when employing tetramethoxy silane as the coupling agent without passivation by the addition of alcohol, the polymer tends to degrade on hydrogenation. The degradation appears to be by cleaving arms off at the Si coupling center. This could be reduced or eliminated by contacting the coupled polymer with an alcohol, such as methanol, after coupling is complete and prior to hydrogenation. In that case it is preferred that the ratio of alcohol to P-Li be from about 1 to 1.5 moles of alcohol per mole of P-Li (where the amount of P-Li in the calculation is based on the amount of living chain ends which were present prior to the addition of the coupling agent). However, it has been found that much less alcohol is needed when employing tetraethoxy silane or tetrabutoxy silane as the coupling agent. In that situation the ratio of alcohol to P-Li should be from about 0.05 to about 0.5 moles of alcohol per mole of P-Li. Likewise, when using trialkoxy silanes such as MTMS or IBTMO, it is preferable to add an alcohol, such as 2-ethyl hexanol prior to hydrogenation. For example, the alcohol can be added prior to hydrogenation at a ratio of alcohol to P-Li of about 0.05 to about 0.5 moles of alcohol per mole of P-Li.

After hydrogenation, the hydrogenated polymers may be cleaned up by standard techniques, such as addition of aqueous acid solutions to remove the residues of the polymerization initiator and hydrogenation catalyst. It is usually preferred to add an antioxidant to the reaction mixture before isolation of polymer.

The polymer is separated from the reaction mixture by standard techniques, such as steam stripping or coagulation with a suitable non-solvent such as an alcohol or water. In the case of steam stripping, the polymer crumb may be separated from the volatile solvent by countercurrent flow through a cyclone. In a like manner, the coagulated polymer crumb may be separated from the liquid solvent phase by centrifugation or filtration. Alternatively, the polymer may be recovered by passing the cement through a devolatilizing extruder. Residual solvent and other volatiles can be removed from the isolated polymer by heating, optionally under reduced pressure or in a forced airflow.

In accordance with a further embodiment of this invention, there is provided a process for producing the polymers as defined above. This process includes basically three steps. The first step is the step in which a living polymer having the formula P-Li is produced. The second step is that in which this living polymer is coupled with the coupling agent of this invention as defined above. The third step, which is optional, is a hydrogenation step.

The first step of this process is carried out by reacting a mono-functional lithium initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium-based initiator systems used in the first step of the process to make the coupled polymers of this invention are based on lithium having the general formula R" Li wherein R" is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexyllithium. The amount of the lithium initiator employed depends upon the desired properties of the polymer, particularly the desired molecular weight. Normally, the organomonolithium initiator is employed in the range of from about 0.1 to about 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having from 4 to 10 carbon atoms or a mixture of such diluents. Examples for the diluent are n-hexane, hexanes, n-heptane, heptanes, 2,2,4-trimethylpentane, cyclohexane, cyclopentane, isopentane, benzene and toluene. The reaction is generally carried out with a weight ratio of diluent to monomers exceeding 1. Preferably the diluent is employed in a quantity of from about 200 to about 1000 parts by weight per 100 parts by weight of total monomers.

It is also important to control the molecular weight of the various blocks. Regarding the AB block copolymer composition, for each A block the desired block weights are 3,000 to about 60,000, preferably about 5,000 to about 50,000. For each B block the desired block weights are about 20,000 to about 200,000, preferably about 20,000 to about 150,000. These molecular weights are most accurately determined by light scattering measurements, and are expressed as number average molecular weights.

Regarding the CDE block copolymer composition, for each D block the desired block weights are 3,000 to about 60,000, preferably about 5,000 to about 50,000. For each E block the desired block weights are about 20,000 to about 200,000, preferably about 20,000 to about 150,000. For each C block the desired block weights are about 1,000 to about 25,000, preferably about 3,000 to about 15,000.

Regarding the FGH block copolymer composition, for each F block the desired block weights are 3,000 to about 60,000, preferably about 5,000 to about 50,000. For each G block the desired block weights are about 10,000 to about 180,000. For each H block the desired block weights are about 10,000 to about 180,000.

It is also important to control the microstructure or vinyl content of the conjugated diene in the B, C and E blocks. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 10 to 80 mol percent of the condensed butadiene units in the polymer block have a 1,2-addition configuration. Preferably, from about 30 to about 80 mol percent of the condensed butadiene units should have 1,2-addition configuration. When referring to the use of isoprene as the conjugated diene, it is preferred that about 5 to 80 mol percent of the condensed isoprene units in the block have 3,4-addition configuration. Polymer microstructure (mode of addition of the conjugated diene) is effectively controlled by addition of an ether, such as diethyl ether, a diether, such as 1,2-diethoxypropane, or an amine as a microstructure modifier to the diluent. Suitable ratios of microstructure modifier to lithium polymer chain end are disclosed and taught in U.S. Re. 27,145.

The polymerization reaction in step 1 usually occurs within a period of time ranging from a few minutes up to about 6 hours. Preferably, the reaction is carried out within a time period of from about 10 minutes to about 2 hours. The polymerization temperature is not critical and will generally be in the range of from 30° C. to about 100° C., preferably in the range of about 55° to about 85° C.

At the conclusion of the polymerization, in order to carry out the second or coupling step, the polymerization mixture is blended with the coupling agent. This is done before any material that would terminate the polymerization reaction and that would remove the lithium atom from the polymer chain end is added to the reaction mixture. Thus the blending of the polymerization mixture and the coupling agent is carried out before any material such as water, acid, or alcohol is added to inactivate the living polymer. The second step of coupling the living polymer is thus carried out as described in detail above. The third step is the hydrogenation, which is also described in detail above.

The relative amounts of the tetra-branched (IV), tri-branched (II), di-branched (II) and linear diblock (I) species are: 0 to 5 weight percent tetra-branched IV, 0 to 60 weight percent tri-branched III, 40 to 95 weight percent di-branched II and 2 to 10 weight percent linear diblock I. Preferred amounts are: 0 to 5 weight percent IV, 0 to 36 weight percent III, 60 to 95 weight percent II and 4 to 8 weight percent I.

The block copolymer composition has a Coupling Efficiency ("CE") of about 90 to 98 weight percent, preferably about 92 to about 98 weight percent. Coupling Efficiency is defined as the proportion of polymer chain ends which were living, P-Li, at the time the coupling agent was added that are linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled moieties plus the area under the curve for the starting, uncoupled polymer species (I+II+III+IV). This ratio is multiplied by 100 to convert the coupling efficiency to a percentage value.

The percentage of mono alkenyl blocks (i.e., A blocks in the AB copolymer, D blocks in the CDE copolymer, and F blocks in the FGH copolymer) in the block copolymer composition is desired to be about 5 to about 50 weight percent, preferably about 10 to about 40 weight percent.

Various materials are known to be detrimental to the lithium alkyl initiated polymerization. Particularly, the presence of carbon dioxide, oxygen, water and alcohols should be avoided during an organomonolithium-initiated polymerization reaction of step 1 of this combined process for making the coupled polymers. Therefore, it is generally preferred that the reactants, initiators, and the equipment be free of these materials and that the reaction is carried out under an inert gas such as nitrogen.

In one embodiment of the present invention, one may polymerize first styrene, then butadiene and finally isoprene, therein producing an S-B-I-triblock arm. As shown below in Example 5, use of isoprene to cap the arm results in high coupling efficiencies and increased linearity of the polymer.

EXAMPLES

The following examples are provided to illustrate the present invention. The examples are not intended to limit the scope of the present invention and they should not be so interpreted. Amounts are in weight parts or weight percentages unless otherwise indicated.

Example 1

A diblock polymer anion, S-B-Li, is prepared as follows (Experiment 7774): 96 kg cyclohexane and 24 kg styrene are charged to a reactor, followed by 590 milliliters of a sec-butyl lithium solution (12% wt BuLi, 0.86 mol). A second reactor is charged with 264 kg cyclohexane, 25 kg diethyl ether and 20.2 kg butadiene. Following titration to remove impurities, 95 kg of polystyryllithium solution prepared in the first reactor is transferred to the second reactor. After polymerization has commenced, an additional 20.3 kg of butadiene is added, at a rate sufficient to keep the temperature around 55° C. After about 98% conversion of the butadiene, 45 grams of tetramethoxy silane ("TMSi") is added (TMSi:PLi about 0.45). The final product consists of an almost 50:50 mixture of 2-arm (linear) and 3-arm polymer, with an overall coupling efficiency (all coupled products/coupled products+un-coupled diblock) of 95.3% as measured by a Gel Permeation Chromatography (GPC) method. Before coupling, the styrene block has a molecular weight of 29,000 and the butadiene block has a molecular weight of 62,000.

An aliquot of this polymer is passivated prior to hydrogenation by the addition of MeOH. An equivalent of MeOH is added for every equivalent of C-Li chain ends present prior to the coupling reaction. The MeOH passivated cement is hydrogenated using a standard Co/Al technique. The hydrogenation catalyst is prepared by adding triethylaluminum to cobalt (II) neodecanoate (Al/Co=2.0 (mol/mol)) in a hydrocarbon solvent. The catalyst is added to the cement under hydrogen pressure at a level that affords a concentration of 6 ppm of Co in the cement. Hydrogenation at 78° C. for 18 hours results in the saturation of 98.5% of the C=C bonds in the rubber segment of the polymer (see Experiment 7774H3 in Table 4). Importantly, after complete hydrogenation, the coupling efficiency of the polymer is unchanged; the coupling efficiency of the hydrogenated polymer is assayed at 95.7% by the GPC method. The catalyst is removed by washing with aqueous phosphoric acid and water, and the polymer is recovered via steam stripping, under conditions typical for hydrogenated polymers.

In a comparative example, a sample of the same polymer (7774) is hydrogenated without methanol addition (Experiment 7774H2, see Table 4) using the Co/Al technique ([Co]=16 ppm, 60° C., 6 hr). At 99.5% hydrogenation of the C=C centers, the cement which has not been passivated with MeOH has undergone severe degradation by a chain cleavage mechanism; only 90.6% of the polymer remains coupled as assayed by GPC. Nearly 5% of the coupled polymer in the starting material has been degraded to the strength reducing uncoupled diblock arm during hydrogenation. Hydrogenation without passivation with MeOH results in degradation of the coupled polymer.

In a second comparative example, a sample of the same polymer (7774) is hydrogenated without methanol addition (Experiment 7774H1, see Table 3) using a standard Ni/Al technique. The hydrogenation catalyst is prepared by adding triethylaluminum to nickel(II) octoate (Al/Ni=2.16 (mol/mol)) in a hydrocarbon solvent. The catalyst is added to the cement under hydrogen pressure at a level that affords a concentration of 45 ppm of Ni in the cement. Hydrogenation at 100° C. for 18 hours results in the saturation of 97.1% of the C=C bonds in the rubber segment of the polymer. At this level of conversion, the cement that has not been passivated with MeOH has been severely degraded; only 89.8% of the polymer remained coupled following hydrogenation. Over 5% of the coupled polymer in the starting material has been degraded to the strength reducing uncoupled diblock arm during hydrogenation. Hydrogenation without passivation with MeOH results in degradation of the coupled polymer.

The average mechanical properties of oiled compounds prepared from the polymer hydrogenated in the presence of methanol (CE=95.7% after hydrogenation) are compared to those of the same compounds, but prepared with an S-EB-S sequentially polymerized triblock copolymer (listed as CP-1), in Table 1 below. The properties of the compounds made with the coupled product of the present invention are quite comparable to those of the compounds made with the sequential triblock.

TABLE 1

Average Mechanical Properties Of Oiled Compounds Prepared
From The Polymer Hydrogenated In The Presence Of Methanol

| polymer | phr oil | Tensile Strength (PSI) | Elongation (%) | 100% Modulus (PSI) | 500% Modulus (PSI) | 1000% Modulus (PSI) | 1500% Modulus (PSI) |
|---|---|---|---|---|---|---|---|
| CP-1 | 200 | 954 | 1845 | 16 | 4 | 134 | 391 |
| CP-1 | 300 | 469 | 1973 | 8 | 23 | 74 | 172 |
| CP-1 | 500 | 237 | 2176 | 3 | 9 | 25 | 76 |
| 7774H3 | 200 | 812 | 1788 | 14 | 43 | 132 | 412 |
| 7774H3 | 300 | 424 | 2026 | — | 13 | 55 | 153 |
| 7774H3 | 500 | 190 | 2011 | 2 | 6 | 26 | 98 |

Table 2 summarizes the results of subsequent reactions in which diblock copolymers comparable to those prepared in Experiment 7774 above (Example #1) are coupled with TMSi at TMSi:Li=0.45 (mol/mol). Good coupling efficiency is observed. This coupling technique is quite robust.

TABLE 2

Results for S-Bd-Li Coupling Using Tetramethoxysilane

| | Block Molecular Weight | | Si/Li | CE | Vinyl | Arm Distribution % | | | |
|---|---|---|---|---|---|---|---|---|---|
| Expt. | Step I | Step II | (mol/mol) | (%) | (%) | 1 | 2 | 3 | 4 |
| 7774 | 28.3 | 59.0 | 0.45 | 95.2 | 38 | 5 | 46 | 49 | t |
| 7792 | 28.2 | 61.2 | 0.45 | 95.9 | 38 | 4 | 51 | 43 | 2 |
| 7800 | 28.2 | 64.1 | 0.45 | 93.2 | 38 | 7 | 45 | 46 | 2 |

"Block Molecular Weight" values are in thousands, "Si/Li" is the ratio of tetramethoxysilane coupling agent to s-BuLi initiator, "CE" is coupling efficiency, Vinyl refers to the 1,2-content of the butadiene portion of the polymer, 1 Arm is uncoupled diblock (I), 2 Arm is the linear triblock copolymer (II), 3 (III), and 4 Arm (IV) polymers are radial in structure, and t stands for a trace.

For all polymerizations, half of the butadiene in Step II is added in batch with the remainder being added via a programmed addition. All polymerizations are at 14% solids. The coupling agent is added at 6 half-lives into Step II.

The results of hydrogenation using Ni and Co based catalysts are summarized in Tables 3 and 4, respectively. All of the hydrogenation reactions described in Table 3 are comparative examples. All are performed without methanol addition and show severe loss of coupling efficiency following hydrogenation.

TABLE 3

Results For Hydrogenation Using A Ni/Al Technique,
Without MeOH Passivation, Of S-Bd-S Polymers
Coupled With Tetramethoxysilane

| | Hydrogenation Conditions | | | | Hydrogenation Results | |
|---|---|---|---|---|---|---|
| Expt. | [Ni] (ppm) | Temp. (° C.) | Time (hr) | RU (meq/g) | CONVERSION (%) | CE (% wt) |
| 7774H1 | 45 | 100 | 18 | 0.35 | 97.1 | 89.8 |
| 7776H1 | 50 | 85 | 19 | 0.11 | 99.1 | 83.3 |

TABLE 3-continued

Results For Hydrogenation Using A Ni/Al Technique,
Without MeOH Passivation, Of S-Bd-S Polymers
Coupled With Tetramethoxysilane

| | Hydrogenation Conditions | | | | Hydrogenation Results | |
|---|---|---|---|---|---|---|
| Expt. | [Ni] (ppm) | Temp. (° C.) | Time (hr) | RU (meq/g) | CONVERSION (%) | CE (% wt) |

"[Ni]" is the final concentration of Ni in the polymer cement, the Ni is from a standard nickel octoate/triethylaluminum (Al/Ni = 2.16 (mol/mol)) catalyst, "Temp." is the final hydrogenation temperature, "Time" is the time required to reach the final level of conversion, "RU" is the residual unsaturation of the final polymer as measured by H-NMR and is reported in meq of C=C centers per g of polymer, "Conversion" is the final level of saturation of the butadiene portion of the polymer and "CE" is a measure of the level of coupling in the final, hydrogenated polymer. Before hydrogenation, over 92 wt % of the 7776 product was linked by the coupling agent.

Experiment 7774H2 in Table 4 is a comparative example; it is conducted without passivating the cement with MeOH before hydrogenation. As noted above, the polymer is severely degraded during hydrogenation, as a result the other examples in Table 4 are illustrative embodiments of the present invention. In each of these experiments, the cement is passivated by the addition of an equivalent of MeOH prior to hydrogenation. It should be noted that by comparison to the coupling efficiency of the corresponding starting polymer in Table 2 the coupling efficiency of the hydrogenated polymer is hardly changed. When TMSi is used as the coupling agent, passivation of the cement by the addition of an equivalent of MeOH prior to hydrogenation is an effective way to prepare highly coupled and as a result very strong block copolymers.

TABLE 4

Results For Hydrogenation Using A Co/Al Technique
Of S-Bd-S Polymers Coupled With Tetramethoxysilane

| | Hydrogenation Conditions | | | | Hydrogenation Results | |
|---|---|---|---|---|---|---|
| Expt. | [Co] (ppm) | Temp. (° C.) | Time (hr) | RU (meq/g) | CONVERSION (%) | CE (% wt) |
| 7774H2 | 16.0 | 60 | 6 | 0.06 | 99.5 | 90.6* |
| 7774H3 | 6.0 | 78 | 18 | 0.18 | 98.5 | 95.7 |
| 7776H2 | 9.0 | 92 | 28 | 0.14 | 99.4 | 92.1 |

TABLE 4-continued

Results For Hydrogenation Using A Co/Al Technique
Of S-Bd-S Polymers Coupled With Tetramethoxysilane

| | Hydrogenation Conditions | | | RU | Hydrogenation Results | |
|---|---|---|---|---|---|---|
| Expt. | [Co] (ppm) | Temp. (° C.) | Time (hr) | (meq/g) | CONVERSION (%) | CE (% wt) |
| 7779H2 | 5.5 | 72 | 1 | 0.06 | 99.5 | 88.7 |
| 7792H1 | 5.5 | 65 | 19 | 0.09 | 99.2 | 94.9 |
| 7792H2 | 5.5 | 60 | 24 | 0.03 | 99.7 | 95.1 |
| 7800 | 4.0 | 87 | 18 | 0.14 | 98.8 | 91.8 |

*(w/o MeOH)
"[Co]" is the final concentration of Co in the polymer cement, the Co is from a standard cobalt neodecanoate/triethylaluminum (Al/Co = 2.0 (mol/mol)) catalyst, "Temp." is the final hydrogenation temperature, "Time" is the time required to reach the final level of conversion, "RU" is the residual unsaturation of the final polymer as measured by H-NMR and is reported in meq of C=C centers per g of polymer, "Conversion" is the final level of saturation of the butadiene portion of the polymer and "CE" is a measure of the level of coupling in the final, hydrogenated polymer. All hydrogenation experiments, except for Run 7774 w/o MeOH, involved treatment of the polymer cement with an equivalent (basis C—Li centers in the uncoupled polymer) of MeOH prior to hydrogenation. Prior to hydrogenation, 89 wt % of the 7779 product was linked by the coupling agent.

Using the polymer synthesis procedure outlined above in Example 1, a living triblock copolymer, Bd-S-Bd-Li, is prepared. An aliquot of the living polymer is terminated at each step in the polymerization by the addition of MeOH and the individual aliquots are analyzed by GPC affording the step block molecular weight results shown in Table 5. The living cement is coupled using TMSi as the coupling agent (TMSi/Living Chain End=0.45 (mol/mol)). The efficiency of the coupling reaction is excellent, 96%, as is seen for the coupling of living diblock copolymers. As displayed in Table 5, the coupled polymer consists of mostly a linear dimer and a branched three arm polymer as is observed for the coupling of living diblock copolymers. The new polymer has the pentablock configuration Bd-S-Bd-S-Bd.

TABLE 5

Results for Bd-S-Bd-Li Coupling Using Tetramethoxysilane.

| | Block Molecular Weight | | | Si/Li | CE | Vinyl | | Arm Distribution (%) | | | |
|---|---|---|---|---|---|---|---|---|---|---|---|
| Expt. | Step I | Step II | Step III | (mol/mol) | (%) | Step I | Step III | 1 | 2 | 3 | 4 |
| 7768 | 5.9 | 8.9 | 26.5 | 0.45 | 95 | 30 | 38 | 5 | 51 | 40 | 4 |

See footnote to Table 2 for a definition of the column headings.

The tetramethoxysilane coupled, pentablock copolymer cement from Experiment 7768 is passivated by the addition of one mole of MeOH for every mole of living chain ends present in the cement prior to the coupling reaction. Hydrogenation, after passivation with MeOH, using the Ni/Al technique described in Table 6, affords a selectively hydrogenated pentablock copolymer with essentially no loss of coupling efficiency in the saturated polymer. The hydrogenation catalyst is extracted from the polymer cement by contacting the cement with aqueous acid in the presence of air. The polymer is recovered from the washed cement by a steam stripping process. Analysis of the product afforded the data in Table 6. A solvent cast film of the product polymer has remarkable strength. In this illustrative embodiment of the present invention, a strong, highly coupled E/B-S-E/B-S-E/B polymer is prepared by 1) coupling the living triblock copolymer with tetramethoxysilane, 2) passivating the cement by the addition of MeOH, and 3) hydrogenating the polymer using a Ni/Al technique.

TABLE 6

Results for Hydrogenation of Bd-S-Bd-S-Bd Polymer Coupled With Tetramethoxysilane.

| | Hydrogenation Conditions | | | Hydrogenation Conditions | | |
|---|---|---|---|---|---|---|
| Expt. | [Ni] (ppm) | Temp. (° C.) | Time (hr) | RU (meq/g) | Conversion (%) | CE (% wt) |
| 7768H1 | 60 | 70 | 75 | 0.19 | 98.6 | 95.0 |

See footnote to Table 3 for a definition of the column headings.

Example 2

A diblock polymer anion, S-B-Li, is prepared as follows (run 7852D): 60 kg cyclohexane and 15 kg styrene are charged to a reactor, followed by 400 milliliters of sec-butyl lithium. A second reactor is charged with 155.4 kg cyclohexane, 15 kg diethyl ether and 23.8 kg butadiene. Following titration to remove impurities, 56 kg of polystyryllithium solution prepared in the first reactor is transferred to the second reactor. After about 98% conversion of the butadiene, 26.3 grams of tetramethoxy silane ("TMSi") is added (TMSi:PLi about 0.45). The final product consists of 41% 2-arm (linear) and 53% 3-arm polymer, with an overall coupling efficiency (all coupled products/coupled products+ un-coupled diblock) of about 96%. The styrene block has a molecular weight of 29,300 and the butadiene block has a molecular weight of 62,000.

The results of the following hydrogenation experiments are summarized in FIG. 1.

A sample of the polymer is hydrogenated with 100% methanol/Li addition (run 7852D-H4) to a residual olefin concentration of 0.10 meq./g. in the presence of 10 ppm Co/solution of a cobalt neodecanoate-aluminum triethyl catalyst (Al/Co=1.6 mol/mol). After hydrogenation under these conditions, the polymer remains 95.7% coupled. The catalyst is removed by washing with aqueous phosphoric acid, and the polymer is recovered via steam stripping, under conditions typical for hydrogenated polymers.

A sample of the polymer is hydrogenated with 50% methanol/Li addition (run 7852D-H2) to a residual olefin concentration of 0.07 meq/g in the presence of 10 ppm Co/solution of a cobalt neodecanoate-aluminum triethyl catalyst (Al/Co=1.6 mol/mol). After hydrogenation under these conditions, the polymer remains 94.7% coupled. The catalyst is removed by washing with aqueous phosphoric acid, and the polymer is recovered via steam stripping, under conditions typical for hydrogenated polymers.

A sample of the polymer is hydrogenated with 10% methanol/Li addition (run 7852D-H1) to a residual olefin concentration of 0.13 meq/g in the presence of 16 ppm Co/solution of a cobalt neodecanoate-aluminum triethyl catalyst (Al/Co=1.6 mol/mol). After hydrogenation under these conditions, the polymer remains 92% coupled. The catalyst is removed by washing with aqueous phosphoric acid, and the polymer is recovered via steam stripping, under conditions typical for hydrogenated polymers.

A diblock polymer anion, S-B-Li, is prepared as follows (run 7919D): 80 kg cyclohexane and 20 kg styrene are charged to a reactor, followed by 510 milliliters of sec-butyl lithium. A second reactor is charged with 188 kg cyclohexane, 18 kg diethyl ether, and 28.5 kg butadiene. Following titration to remove impurities, 67 kg of polystyryllithium solution prepared in the first reactor is transferred to the second reactor. After about 98% conversion of the butadiene, 43.3 grams of tetraethoxy silane ("TESi") is added (TESi:PLi about 0.45). The final product consists of 54.5% 2-arm (linear) and 38.6% 3-arm polymer, with an overall coupling efficiency (all coupled products/coupled products+ un-coupled diblock) of about 96%. The styrene block has a molecular weight af 28,730 and the butadiene block has a molecular weight of 62,000.

A sample of the polymer is hydrogenated with 10% methanol/Li addition (run 7919D-H1) to a residual olefin concentration of 0.21 meq/g in the presence of 5 ppm Co/solution of a cobalt neodecanoate-aluminum triethyl catalyst (Al/Co=1.6 mol/mol). After hydrogenation under these conditions, the polymer remains 94.4% coupled. The catalyst is removed by washing with aqueous phosphoric acid, and the polymer is recovered via steam stripping, under conditions typical for hydrogenated polymers.

Comparative Example 1 (Experiment 167)

When a trialkoxysilane hydride is used as a coupling agent, rather than the tetraalkoxysilanes of the present invention, the coupled polymer suffers extreme degradation during hydrogenation. A solution of a living, anionic polybutadienyl-lithium reagent is prepared by adding 24.52 g of a 10% wt solution of s-BuLi (0.038 mol) to a mixture containing 200 g of butadiene, 121 g of diethyl ether, and 1655 g of cyclohexane. Polymerization is allowed to proceed for 32 minutes at temperatures below 55° C. (10 half-lives). An aliquot of the polymer is quenched and analyzed by GPC. The molecular weight of the polybutadiene is 4,802. The remainder of the living polybutadienyl-lithium cement is treated with 1.69 g of trimethoxysiliconhydride, (MeO)$_3$SiH, TMSiH (0.0138 mol) (Si/Li=0.36 (mol/mol). The coupling reaction is allowed to proceed at 40° C. for 30 minutes. An aliquot of the coupled cement is analyzed by GPC and found to contain only three arm branched polymer and uncoupled homopolymer. The coupling efficiency is 84%. The cement is treated with 1.4 g of MeOH (0.04 mol); this is one mole of MeOH per C-Li chain end in the living polymer prior to coupling. When tetramethoxysilane is used as a coupling agent, this is enough MeOH to passivate the polymer cement against degradation during hydrogenation of the polybutadiene. Hydrogenation, using the Ni/Al catalyst (101 ppm of Ni in the cement) described in Table 3, at 700 psi of hydrogen pressure, at temperatures below 70° C. for 3 hr, results in complete saturation of the butadiene polymer (99.5% of the C=C centers is reduced). Unfortunately, degradation of the coupled polymer is extreme. The GPC analysis of the hydrogenated polymer is so complex due to the fragmentation of the polymer that quantitative analysis is not possible. It is clear that most of the coupled polymer degraded during hydrogenation. In this case, using the MeOH passivation technique that has worked to protect tetramethoxysilane coupled polymers from degradation during hydrogenation and using the same Ni/Al hydrogenation technique does not work when the polymer is coupled with TMSiH.

Comparative Example 2 (Experiment 155)

The procedure of Comparative Example #1 is repeated with the significant exception that triethoxysiliconhydride, (EtO)$_3$SiH, TESiH, is used as the coupling agent rather than TMSiH. Hydrogenation with a Ni/Al technique gave extreme degradation, which has not been observed when tetraethoxysilane, TESi, is used as the coupling agent. Addition of an equivalent of MeOH before hydrogenation does not passivate the polymer against degradation as is observed when tetramethoxysilane is used as the coupling agent. When TESiH is used to couple a polybutadienyl-lithium reagent and an equivalent of MeOH is added before hydrogenation extreme degradation of the coupled polymer during hydrogenation is still observed.

In this preparation, the living, anionic polybutadienyl-lithium moiety has a molecular weight of 5,240 (by GPC analysis of a terminated aliquot). The living polymer cement is treated with sufficient TESiH to give a Si/Li ratio of 0.45 mol/mol. Analysis of the coupled polymer (by GPC) shows essentially complete conversion to the branched three arm polymer; the level of uncoupled arms is estimated to be less than 3%. The efficiency of the coupling reaction is excellent. Half of the coupled polymer cement is carried forward to be hydrogenated using the Ni/Al procedure described in Comparative Example 1. The hydrogenated polymer product is washed with aqueous acid to remove the spent hydrogenation catalyst and analyzed by GPC. Over half of the coupled polymer product is degraded to a species having a molecular weight comparable to that of the starting uncoupled polymer chain (arm). As noted in Comparative Example 1, this sample is so badly degraded that it is not possible to quantitatively measure the level of degradation from the GPC data. Clearly, the process that uses TESiH as the coupling agent does not give the results which are observed when TESi is used as the coupling agent. The polymer coupled with the triethoxysilane reagent is badly degraded during hydrogenation and is not an example of the present invention.

The remainder of the coupled, but not hydrogenated, polymer cement is treated with one equivalent of MeOH per equivalent of C-Li centers in the uncoupled precursor cement. The MeOH treated cement is then hydrogenated using the procedure described above for the "not MeOH treated" cement. Analysis by GPC shows even more extreme degradation in this sample. More than 70% of the coupled polymer is degraded to material having a molecular weight similar to that of an unlinked arm. Clearly, adding MeOH to the TESiH coupled polymer prior to hydrogenation does not passivate this product to degradation during hydrogenation. When tetramethoxysilane is used as the coupling agent, as outlined in Example 1, added MeOH did passivate the polymer against degradation during hydrogenation. A process that uses triethoxysiliconhydride as the coupling agent with alcohol addition prior to hydrogenation is not part of the present invention.

Comparative Example 3

A living, anionic, polystyrene-polybutadienyl-lithium reagent is coupled with methyldichlorosiliconhydride, MeCl2SiH, and MDSiH. Hydrogenation of the coupled polymer cement using the Ni/Al technique described in Table 3 results in degradation of the coupled polymer ranging from 10 to 90%. From severe to extreme degradation during hydrogenation is observed when MDSiH is used as the coupling agent. This coupling agent is not part of the present invention.

Example 3

A series of laboratory screening experiments are executed to determine the effect of tetramethoxysilane (TMSi) to Li ratio on overall coupling efficiency and arm distribution.

Polybutadienyllithium of a nominal molecular weight of 2,500 is prepared as follows: 750 grams of cyclohexane, 60 grams of diethyl ether and 100 grams of butadiene are charged to a 1-liter Buchi glass autoclave. The reactor is heated to about 40° C. and about 21 grams of butyllithium solution is added. The reaction temperature is adjusted to about 50° C. and the reaction is allowed to proceed to about 99% conversion. In the first example, a solution of TMSi in cyclohexane is added at about 1.6 mL/min using a syringe pump. Enough TMSi is added to provide 0.5 moles TMSi per mole polymer-Li at the end of the program. Under these conditions, it is anticipated that the coupling reagent will react as fast as it is added, to give close to the maximum attainable coupling efficiency. The result (Table 7) demonstrates that coupling efficiencies in excess of 90% may be achieved. The entire TMSi charge is added rapidly in the remaining examples. High coupling efficiencies are obtained, even in the presence high levels of TMSi, and the fraction of radial (>2 arm) product is much lower.

TABLE 7

Coupling Efficiencies

| Run # | TMSi:Pli | CE | Un-cpl'd | Linear (2-arm) | 3-arm | 4-arm |
|---|---|---|---|---|---|---|
| 3-1 | 0.3[1] | 93% | 7% | 3% | 57% | 32% |
| 3-2 | 0.5 | 95% | 5% | 76% | 17% | 2% |

TABLE 7-continued

Coupling Efficiencies

| Run # | TMSi:Pli | CE | Un-cpl'd | Linear (2-arm) | 3-arm | 4-arm |
|---|---|---|---|---|---|---|
| 3-3 | 0.7 | 92% | 8% | 72% | 18% | 2% |

[1]Total Charge of 0.5:1 TMSi:PLi over 20 minutes. A ratio of 0.3 corresponds to the observed arm distribution.

Example 4

A series of laboratory screening experiments were executed to determine the effect of the tetraethoxysilane (TESi) to Li ratio and the presence of polar co solvents and modifiers on overall coupling efficiency and arm distribution in coupling reactions of polyisoprenyllithium. Reactions were carried out according to the following general procedure; details for individual reactions are summarized in Table 8. Cyclohexane (CH) and any co-solvents used in the process were charged into a 1-liter stainless steel autoclave and the temperature was increased to 40° C. The s-butyllithium solution (about 5% wt in CH) was then charged, followed immediately by the batch portion of the isoprene charge, and the temperature was increased to 50° C. Consumption of the isoprene monomer was monitored in realtime. After about half of the batch charge had been consumed, the remainder of the isoprene was added at a rate of 0.5 cc/min. When the polymerization was judged to be complete, the TESi was added as a 10% wt. solution in cyclohexane. Reaction was allowed to continue for 1 hour at 50° C., although intermediate samples suggest that the coupling reactions were generally complete in 15 minutes. The molecular weight of the initial arm, as well as the overall coupling efficiency and the distribution of arms, were determined by Gel Permeation Chromatography. $^1$H NMR determined the isoprene microstructure and the polymer concentration (solids). The moles of polyisoprenyllithium were calculated using the molecular weights and solids values from these analyses. This data is summarized in Table 9. It is apparent that coupling efficiencies on the order of 90% can be obtained when the molar ratio of TESi to lithium is close to 0.5, and that the product is substantially linear. In contrast, almost 30% of the coupled species were radial (≧3-arms) when a similar experiment was performed using polybutadienyllithium. These results were observed in the presence of both diethyl ether and diethoxypropane (DEP), indicating that the coupling reaction is not very sensitive to the solvent system.

TABLE 8

| Run # | CH (g) | s-buLi soln. (g) | Modifier (#g) | Ip Batch (g) | Ip Prog. | TESi soln. (g) |
|---|---|---|---|---|---|---|
| 1 | 348 | 25.3 | none | 53.1 | 9.4 | 13.1 |
| 2 | 360 | 13.5 | none | 53.1 | 9.4 | 13.1 |
| 3 | 358 | 16.2 | none | 53.1 | 9.4 | 13.1 |
| 4 | 308 | 27.9 | diethyl ether (38) | 53.1 | 9.4 | 13.1 |
| 5 | 316 | 20.2 | diethyl ether (38) | 53.1 | 9.4 | 13.1 |

TABLE 8-continued

| Run # | CH (g) | s-buLi soln. (g) | Modifier (#g) | Ip Batch (g) | Ip Prog. | TESi soln. (g) |
|---|---|---|---|---|---|---|
| 6 | 311 | 25.3 | diethyl ether (38) | 53.1 | 9.4 | 13.1 |
| 7 | 312 | 16.2 | DEP(2.1)[1] | 53.1 | 9.4 | 11.8 |

[1]Diethoxypropane, 10% wt. in cyclohexane.

TABLE 9

| Run # | MW p(Ip) | Solids (wt) | TESi: Li | % 3,4 Isop. | Uncoupled | Linear (2-arm) | Radial (3-arm) | Coupling Efficiency |
|---|---|---|---|---|---|---|---|---|
| 1 | 3,600 | 8.5% | 0.31 | 8% | 31% | 46% | 23% | 69% |
| 2 | 8,400 | 8.3% | 0.74 | 8% | 52% | 49% | 0%[1] | 48% |
| 3 | 6,500 | 8.9% | 0.48 | 8% | 12% | 88% | 0%[1] | 88% |
| 4 | 5,000 | 9.5% | 0.38 | 40% | 10% | 90% | 0%[1] | 90% |
| 5 | 8,700 | 8.2% | 0.78 | 40% | 55% | 44% | 2% | 45% |
| 6 | 6,200 | 8.4% | 0.55 | 40% | 23% | 77% | 0%[1] | 77% |
| 7 | 6,300 | 9.0% | 0.50 | 10% | 11% | 89% | 0%[1] | 89% |

[1]Small high MW shoulder, estimated to be no more than 10% of the area of the linear peak.

Example 5

The addition of a small amount of isoprene at the end of the diene polymerization allows the production of a highly coupled, primarily linear polymer comprised essentially of butadiene and styrene, as demonstrated by the following example.

A 2-gallon stainless steel reactor was charged with 3.2 kg of cyclohexane, 240 g of diethyl ether, and 107 g, of styrene. The reactor temperature was increased to about 50° C. Impurities were removed by adding small aliquots of s-butyllithium until the first evidence of color. 25.3 milliliters of a solution of an approximately 6% wt solution of s-butyllithium in cyclohexane was added, and the styrene was allowed to complete polymerization at 50° C.–60° C. The molecular weight of the polystyrene produced in this reaction was determined to be 6,300 AMU by GPC. The temperature was adjusted to 50° C. and 710 g of butadiene were added at such a rate as to allow the temperature to remain about 50° C. When the butadiene polymerization was complete, 10 g of isoprene was added. A sample collected at this point had a styrene content of 13.8% wt and a vinyl content of 39% basis $^1$H NMR and an overall molecular weight of 50,800 as determined by GPC. After the isoprene had reacted for about 10 minutes, 1.88 g of TESi were added, and the coupling reaction was allowed to proceed for 60 minutes at 50° C. Methanol (0.6 g as a 10% wt solution in CH, one mole per mole of Li) was added to terminate any uncoupled chains the following morning. The final product had a coupling efficiency of 90%, and 87% of the coupled species were linear, the remaining being 3-arm radial.

The polymer prepared above was hydrogenated using a standard Ni/Al technique. The hydrogenation catalyst was prepared by adding triethylaluminum to nickel(II) octoate in a 2.16 to 1 molar ratio (Al/Ni=2.16 (mol/mol)) in a hydrocarbon solvent. The catalyst was added to the cement under hydrogen pressure (700–800 PSI) in three 20 milliliter aliquots, affording a final concentration of about 75 ppm of Ni in the cement. The initial aliquot was charged at a temperature of about 50° C. and the temperature was allowed to increase to about 60° C. The second aliquot was added after about 2 hours. About 5 hours later, the temperature was increased to 80° C. and the third aliquot was added. The hydrogenation reaction was allowed to proceed overnight, resulting in the saturation of about 99% of the C=C bonds in the rubber segment of the polymer. The catalyst was removed by washing with aqueous phosphoric acid and water, antioxidant (Ethanox 330, 0.1 PHR) was added, and the polymer was recovered via steam stripping, under conditions typical for hydrogenated polymers. The final product maintained a coupling efficiency of 90% with 87% of the coupled product being linear.

Example 6

A diblock polymer anion, S-B-Li, is prepared as follows: 360 kg of cyclohexane and 19.7 kg, of styrene were charged to a reactor. The reactor temperature was increased to about 40° C. Impurities were removed by adding small aliquots of s-butyllithium until the first evidence of color. 1,820 milliliters of a solution of an approximately 12% wt solution of s-butyllithium in cyclohexane was added, and the styrene was allowed to complete polymerization at about 60° C. The molecular weight of the polystyrene produced in this reaction was determined to be 7,900 AMU by GPC. The temperature was maintained at 60° C., 333 g. of 1,2-diethoxypropane were added, and then 70.4 kg of butadiene were added at such a rate as to allow the temperature to remain about 60° C. A sample collected at this point had a styrene content of 25% wt and a vinyl content of 69% basis $^1$H NMR and an overall molecular weight of 34,700 as determined by GPC. 251 g of TESi was added, and the coupling reaction was allowed to proceed for 60 minutes at 60° C. Methanol (8.1 g, 0.1 mole per mole of Li) was added to terminate the reaction. The final product had a coupling efficiency of 91%, and 66% of the coupled species were linear, the remaining being 3-arm radial.

A sample of the polymer was hydrogenated to a residual olefin concentration of 0.13 meq/g in the presence of 15 ppm Co/solution of a cobalt neodecanoate-aluminum triethyl catalyst (Al/Co=1.7 mol/mol). After hydrogenation under these conditions, the polymer remains 91% coupled. The catalyst is removed by washing with aqueous phosphoric acid, and the polymer is recovered via steam stripping, under conditions typical for hydrogenated polymers.

Example 7

A diblock polymer anion, S-B-Li, is prepared as described in Example 6: 361 kg of cyclohexane and 16.7 kg, of styrene were charged to a reactor. The reactor temperature was increased to about 40° C. Impurities were removed by adding small aliquots of s-butyllithium until the first evidence of color. 1,900 milliliters of a solution of an approximately 12% wt solution of s-butyllithium in cyclohexane was added, and the styrene was allowed to complete polymerization at about 60° C. The molecular weight of the polystyrene produced in this reaction was determined to be 6,400 AMU by GPC. The temperature was maintained at 60°

C., 320 g. of 1,2-diethoxypropane were added, and then 72.6 kg of butadiene were added at such a rate as to allow the temperature to remain about 60° C. A sample collected at the end of the butadiene polymerization had a styrene content of 21.3% wt and a vinyl content of 69% basis $^1$H NMR and an overall molecular weight of 35,000 as determined by GPC. Following polymerization of the majority of the butadiene, 623 g. of isoprene was added. The isoprene was allowed to polymerize, and then 257 g of TESi was added, and the coupling reaction was allowed to proceed for 60 minutes at 60° C. Methanol (8.5 g, 0.1 mol per mol of Li) was added to terminate the reaction. The final product had a coupling efficiency of 91%, and 72% of the coupled species were linear, the remaining being 3-arm radial.

A sample of the polymer was hydrogenated to a residual olefin concentration of 0.09 meq/g in the presence of 20 ppm Co/solution of a cobalt neodecanoate-aluminum triethyl catalyst (Al/Co=1.7 mol/mol). After hydrogenation under these conditions, the polymer remained 91% coupled. The catalyst was removed by washing with aqueous phosphoric acid, and the polymer was recovered via steam stripping, under conditions typical for hydrogenated polymers.

Example 8

In Example 8, a number of selectively hydrogenated styrene/butadiene block copolymers were prepared with a variety of coupling agents according to a standard polymerization recipe. The molecular parameters of the desired polymer is shown below in Table 10, where Step 1 is the polystyrene block (A), SD1 apparent is the styrene equivalent molecular weight of the styrene/butadiene diblock arm (P), and CE is coupling efficiency. Coupling Efficiency is defined as the proportion of polymer chain ends which were living, P-Li, at the time the coupling agent was added that are now linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled plus the area under the curve for the starting, uncoupled polymer species (I+II+III+IV). This ratio is multiplied by 100 to convert the coupling efficiency to a percentage value.

TABLE 10

Starting recipe for the syntheses described in Example 8.

| | Target Polymer |
|---|---|
| Step I (kg/mole) | 29.0 |
| SD1 Mw (kg/mole) apparent | 136 |
| PSC (%) | 33 |
| Vinyl content (%) | 40 |

The butadiene polymerization was started at 70° C. and the temperature was raised adiabatically up to 80° C. After the butadiene addition was stopped, a soak time of 5 minutes was maintained. Following that the coupling agent was added and allowed to react for at least 10 minutes before the polymer cement was sampled.

The following coupling agents were used in the polymerizations:
Trimethoxy silane hydride (TMS)
Methyl trimethoxy silane (MTMS)
Octyl trimethoxy silane (OCTMO)
Isobutyl trimethoxy silane (IBTMO)
Tetrakis 2-butoxyethyl orthosilicate (BG).
Tetrabutoxy orthosilicate (TBS)

The results of the polymerization experiments are shown below in Table 11, where percentages are expressed as weight percent, CA is coupling agent, CA/Li is the molar ratio of coupling agent to lithium, the 4-arm (IV) fraction may contain a small amount of high molecular weight polymer (it is higher in MW than the tetrabranched polymer (IV), and may come from the coupling of Si centers via an etherification reaction (Si—O—Si); these polymers were included as coupled product in the calculation of coupling efficiency), PSC is percent styrene in the entire block copolymer, and Vinyl is the 1,2 content of the butadiene blocks:

TABLE 11

| | Run # | | | | | |
|---|---|---|---|---|---|---|
| | 8-1 | 8-2 | 8-3 | 8-4 | 8-5 | 8-6 |
| CA | TMS | BG | OCTMO | MTMS | IBTMO | TBS |
| CA/Li | 0.5 | 0.5 | 0.5 | 0.5 | 0.5 | 0.5 |
| Step I (kg/mole) | 28.7 | 28.2 | 28.3 | 28.8 | 28.3 | 29.8 |
| SD1 (app) Kg/mole | 138.0 | 143.3 | 138.0 | 140.0 | 141.2 | 140.7 |
| Uncoupled Polymer (%) (I) | 8.1 | 13.2 | 15.2 | 6.5 | 7.7 | 20.9 |
| Coupled Linear (%) (II) | 31.4 | 21.1 | 70.2 | 79.3 | 78.6 | 16.4 |
| 3-arm (%) (III) | 37.8 | 34.1 | 5.7 | 6.3 | 3.3 | 46.5 |
| 4-arm (%) (IV) | 16.1 | 17.7 | 2.1 | 0.9 | 1.1 | 12.6 |
| CE (%) | 91.3 | 84.7 | 83.7 | 93.0 | 91.5 | 78.3 |
| PSC (%) | 32.5 | 28.2 | 29.7 | 24.4 | 28.7 | 32.0 |
| Vinyl (%) | 34.4 | 35.3 | 35.3 | 38.7 | 41.7 | 42.6 |

From these data one can conclude that coupling agents MTMS and IBTMO are the most promising with respect to coupling efficiency (CE) and low degree of branching. Both agents show a high CE over 90% and linear product content without significant formation of branched product under the applied conditions. Although there are some differences in molecular parameters (e.g., PSC and vinyl content) between the various samples it is clear that MTMS and IBTMO outperform the other coupling agents.

More products were prepared with MTMS to check the repeatability and compatibility with the hydrogenation process. The results for three runs with MTMS are presented in Table 11A.

TABLE 11A

| | Run # | | |
|---|---|---|---|
| | 8-7 | 8-8 | 8-9 |
| CA | MTMS 1 | MTMS 2 | MTMS 3 |
| CA/Li | 0.5 | 0.5 | 0.5 |
| StepI (kg/mole) | 28.8 | 26.3 | 25.4 |
| SD1 (app) Kg/mole | 140.0 | 138.0 | 126.3 |
| SD1 (%)I | 6.5 | 6.8 | 7.1 |

TABLE 11A-continued

| | Run # | | |
|---|---|---|---|
| | 8-7 | 8-8 | 8-9 |
| Linear (%)II | 79.3 | 83.3 | 82.7 |
| 3-arm (%)III | 6.3 | 3.6 | 4.1 |
| 4-arm (%)IV | 0.9 | 0.5 | 0.7 |
| CE (%) | 93.0 | 92.8 | 93.1 |
| PSC (%) | 24.4 | n.a | 32.8 |
| Vinyl (%) | 38.7 | n.a | 40.4 |

The MTMS coupled product results are very consistent in terms of coupling efficiency and linear product formation. Polymer 8-9 was hydrogenated at a solids content of 14%. Prior to hydrogenation, and after coupling, the polymer was first contacted with 2-ethyl hexanol. A first batch experiment showed that a complete conversion (residual unsaturation of 0.04 mille-equivalents per gram) was reached after 90 minutes at 70° C. with 6 ppm Co. The GPC analysis showed that there was no decoupling. A sample from hydrogenation in a continuous hydrogenation unit (CHU) was also prepared. The results from both runs are shown below in Table 11B.

TABLE 11B

| | Precursor | Hydrogenated Batch | Hydrogenated CHU |
|---|---|---|---|
| Linear (%)II | 82.7 | 81.4 | 82.2 |
| 3-arm (%)III | 4.1 | 4.3 | 4.2 |
| 4-arm (%)IV | 0.7 | 1.5 | 1.0 |
| CE (%) | 93.1 | 92.5 | 92.2 |
| PSC (%) | 32.8 | 32.5 | 32.7 |

The results of the hydrogenation show that MTMS is a very good candidate for making hydrogenated polymers since there is no evidence of degradation during the hydrogenation.

Example 9

Various tetraethoxy silane coupled, hydrogenated styrene/butadiene block copolymers (i.e. $(A-B)_nX$ block copolymers) were made in a polymerization process similar to that described in the illustrative embodiment, 7774, in Example 1 above, and the results are presented below in Table 12. The preparation of these polymers differed from that described in Example 1 in that 1) these polymers used tetraethoxysilane as the coupling agent, 2) prior to coupling the molecular weights of the blocks in the living block copolymer were smaller (PS-PBd-Li (A-B-Li)); and 3) a Ni/Al hydrogenation catalyst was used. Consistent with the results in the inventive experiment described in Example 1, the coupling reaction proceeded to give a high level of coupled polymer with good linearity in the coupled product. Hydrogenation of these polymers proceeded with a minimum of degradation. The segment molecular weights for the coupled linear components of these mixtures are given under the heading "Dimension Linear Polymer", with the first and third numbers being the A block molecular weight in kg/mol, and the second or middle number being twice the B block molecular weight in kg/mol. Also given are the vinyl content of the butadiene units prior to hydrogenation ("(%1,2-butadiene content (%)"), coupling efficiency ("Coupling Efficiency (%), the weight percent of linear 2-arm ("Linear Coupled Polymer (%) (II)" and radial three and four arm species ("Branched Polymer (%) (III+IV)"), arms %), the weight percent of diblock ("Uncoupled Polymer (%) (I)"), and the weight percent of uncoupled diblock copolymer following hydrogenation ("Following Hydrogenation Uncoupled Polymer (%)"). This later measurement is a ready analysis of the degree of degradation (decoupling) that occurred during hydrogenation. The increase in uncoupled polymer on hydrogenation was in the range of 1–3%; this level of decoupling is not significant from a product performance perspective. The sample labeled CP-2 is for comparison purposes only, and is a hydrogenated styrene/butadiene block copolymer that has been prepared by coupling with a different coupling agent. CP-2 has a coupling efficiency of about 68%, a vinyl content of about 45%, and molecular weights similar to polymer 9-3. The product labeled 9-10 is a physical blend of products 9-7, 9-8 and 9-9.

TABLE 12

Summary of Molecular Characteristics of Highly Coupled S-E/B-S Polymers.

| Sample Number | Dimension Linear Polymer (II) | 1,2-Butadiene Content (%) | Coupling Efficiency (%) | Branched Polymer (%) (III + IV) | Linear Triblock Copolymer (%) (II) | Uncoupled Polymer (%) (I) | Following Hydrogenation Uncoupled Polymer (%) |
|---|---|---|---|---|---|---|---|
| 9-1 | 5.4-94-5.4 | 38 | 96 | 39 | 57 | 4 | 6 |
| 9-2 | 5.4-71-5.4 | 38 | 96 | 43 | 53 | 4 | 7 |
| 9-3 | 5.3-72-5.3 | 48 | 98 | 30 | 68 | 2 | 3 |
| 9-4 | 6.2-58-6.2 | 38 | 94 | 27 | 67 | 6 | 6 |
| 9-5 | 5.7-50-5.7 | 39 | 95 | 24 | 71 | 5 | 6 |
| 9-6 | 5.3-50-5.3 | 38 | 94 | 28 | 66 | 6 | 7 |
| 9-7 | 5.5-52-5.5 | 39 | 96 | 21 | 75 | 4 | |
| 9-8 | 5.5-52-5.5 | 39 | 96 | 21 | 75 | 4 | |
| 9-9 | 5.5-53-5.5 | 38 | 94 | 20 | 74 | 6 | |
| 9-10 | 5.5-50-5.5 | 38 | 96 | 21 | 75 | 4 | 6 |

Example 10

Highly coupled, very linear, and high vinyl content analogs of the polymers described in Example 9 were prepared using 1,2-diethoxypropane as the microstructure modifier instead of diethyl ether. The use of the tetraethoxysilane coupling technology described above gave the polymers described in Table 13.

Hydrogenation using the Co/Al technique described in Example 1 resulted in essentially no decoupling as assayed by GPC (see Table 13).

TABLE 13

Summary of Molecular Characteristics of Highly Coupled, High Vinyl S-E/B-S Polymers

| Sample Number | Dimension Linear Polymer (II) | 1,2-Butadiene Content (%) | Coupling Efficiency (%) | Branched Polymer (%) (III + IV) | Linear Polymer (%) (II) | Uncoupled Polymer (%) (I) | Following Hydrogenation Uncoupled Polymer (%) |
|---|---|---|---|---|---|---|---|
| 10-1 | 7.9-54-7.9 | 69 | 91 | 31 | 60 | 9 | 8 |
| 10-2 | 6.4-55-6.4 | 68 | 93 | 27 | 66 | 7 | 7 |

The headings used in this table are as defined in Example 9. A polymer of the (CDE)$_n$X type, where n=1, 2, 3, or 4, was prepared using the coupling technology described in Example 1. Prior to coupling, the polymer was a living triblock copolymer, PBd-PS-PBd-Li. Coupling with tetraethoxysilane gave the highly linked polymer described in Table 13A. This polymer was hydrogenated using Ni/Al to make an E/B-S-E/B-S-E/B, pentablock copolymer. As analyzed by GPC, there was no evidence of decoupling of this polymer during hydrogenation.

Polymer 3-arm (III) (%)") in the product) in the coupled polymer product. From the data in Table 14, it is clear that coupling efficiency is high at Si/Li molar ratios between 0.54 and 0.36. Over this range, the proportion of 2-arm polymer (II) in the coupled product ("Coupled Polymer 2-arm (II) (%)") increased with increasing molar ratios of Si/Li. The highest levels of linear coupled polymer were realized at TESi/P-Li (mol/mol)>0.5; at these ratios, over 80% of the coupled polymer was linear. At TESi/Li (mol/mol)>0.4, over 40% of the coupled polymer was the linear triblock copolymer, (II). A well coupled linear block copolymer was prepared over a range of Si/Li molar ratios.

Each of these products was passivated by treatment with 0.1 moles of MeOH per mole of P-Li moieties which were present prior to the addition of the coupling agent, TESi (The alcohol was actually added to the reactor after the coupling reaction was complete). Hydrogenation of each of these block copolymer products using the Co/Al technique described in Example 2 for polymer 7919D-H1 gave fully hydrogenated rubber segments (over 98% of the C=C centers were saturated), S-E/B-S polymers, with no significant loss in coupled polymer content.

TABLE 13A

Summary of Molecular Characteristics of Highly Coupled E/B-S-E/B-S-E/B Polymers

| Sample Number | Dimension Linear Polymer | 1,2-Bd Content (%) | Coupling Efficiency (%) | Branched Polymer (%) (III + IV) | Linear Polymer (%) (II) | Uncoupled Polymer (%) (I) | Following Hydrogenation Uncoupled Polymer (%) |
|---|---|---|---|---|---|---|---|
| 7 | 5.0-8.2-57-8.2-5.0 | 77 | 96 | 50 | 46 | 4 | 4 |

Example 11

Using the polymerization method described for the preparation of 7779 in Example 1, a series of S-Bd-Li polymers were coupled using tetraethoxysilane, TESi, as the coupling agent. The TESi/P-Li ratio (mol/mol) was varied over a narrow range to assess the optimum ratio of Si/Li (mol/mol) for good coupling efficiency in combination with high levels of linearity (minimal levels of branched polymer ("Coupled

TABLE 14

Affect of TESi/P-Li Ratio on Coupling Efficiency and Linearity for Coupled S-Bd-Li.

| Experiment Number | TESi/P-Li (mol/mol) | Coupling Efficiency (%) | Coupled Product 2-arm (II) (%) | Coupled Product 3-Arm (III) (%) |
|---|---|---|---|---|
| 1 | 0.58 | 89.2 | 85.8 | 13.6 |
| 2 | 0.54 | 92.8 | 81.7 | 16.7 |
| 3 | 0.54 | 94.6 | 79.8 | 17.9 |
| 4 | 0.54 | 90.7 | 81.6 | 16.5 |
| 5 | 0.52 | 94.4 | 80.8 | 18.4 |
| 6 | 0.52 | 93.5 | 80.9 | 17.5 |
| 7 | 0.50 | 95.6 | 75.0 | 24.0 |
| 8 | 0.50 | 95.6 | 73.7 | 25.2 |

TABLE 14-continued

Affect of TESi/P-Li Ratio on Coupling Efficiency
and Linearity for Coupled S-Bd-Li.

| Experiment Number | TESi/P-Li (mol/mol) | Coupling Efficiency (%) | Coupled Product 2-arm (II) (%) | Coupled Product 3-Arm (III) (%) |
|---|---|---|---|---|
| 9 | 0.49 | 96.3 | 74.4 | 24.3 |
| 10 | 0.48 | 97.1 | 71.0 | 28.1 |
| 11 | 0.47 | 96.4 | 68.1 | 30.6 |
| 12 | 0.46 | 97.0 | 63.6 | 36.4 |
| 13 | 0.45 | 97.2 | 66.3 | 33.7 |
| 14 | 0.44 | 96.5 | 61.0 | 37.8 |
| 15 | 0.44 | 96.6 | 59.5 | 39.3 |
| 16 | 0.44 | 97.0 | 60.0 | 38.8 |
| 17 | 0.43 | 96.4 | 65.4 | 32.9 |
| 18 | 0.43 | 96.8 | 53.3 | 46.7 |
| 19 | 0.43 | 96.7 | 52.5 | 46.6 |
| 20 | 0.42 | 96.3 | 42.6 | 56.1 |
| 21 | 0.42 | 96.4 | 46.3 | 52.6 |
| 22 | 0.41 | 96.7 | 54.2 | 44.1 |
| 23 | 0.41 | 96.1 | 45.7 | 54.3 |
| 24 | 0.4 | 97.0 | 50.9 | 48.3 |
| 25 | 0.4 | 96.5 | 41.1 | 57.6 |
| 26 | 0.39 | 96.6 | 32.4 | 66.3 |
| 27 | 0.39 | 96.6 | 31.1 | 67.6 |
| 28 | 0.39 | 97.3 | 38.4 | 61.6 |
| 29 | 0.39 | 97.4 | 33.8 | 66.2 |
| 30 | 0.36 | 93.2 | 5.0 | 90.8 |
| 31 | 0.33 | 87.6 | 8.9 | 87.0 |

Example 12

In this example two comparative polymers with isoprene/butadiene midblocks were prepared, along with one polymer according to the present invention. Comparative polymer A (CP-A) was prepared by sequential polymerization of the first styrene block, followed by the mixed diene block, and then the second styrene block, as described below: 60 kg of cyclohexane and 15 kg, of styrene were charged to a reactor. The reactor temperature was increased to about 40° C. Impurities were removed by adding small aliquots of s-butyllithium until the first evidence of color. 992 mL of a solution of an approximately 12% wt solution of s-butyllithium in cyclohexane was added, and the styrene was allowed to complete polymerization at about 60° C. The molecular weight of the polystyrene produced in this reaction was determined to be 11,050 AMU by GPC. 290 kg of cyclohexane, 14.8 kg of butadiene and 14.9 kg of isoprene were added to a second reactor. The temperature was adjusted to about 60° C. and impurities were removed by adding small aliquots of s-butyllithium until the first evidence of color. 63.6 kg of the polystyryllithium solution produced in the first reactor was then transferred into the second reactor. The temperature was maintained at 60° C. After about 10 minutes, 14.9 kg of butadiene and 14.9 kg of isoprene were added, both at a rate of about 500 g/min. The reaction was allowed to proceed at 60° C. until the polymerization of both monomers was essentially complete. A sample collected at this point was analyzed by $^1$H NMR and GPC. The sample had a styrene content of 18.6% wt, 52% wt of the diene monomer was comprised of isoprene and the overall molecular weight was 55,800. 12 kg of styrene was added, and the the reaction was allowed to proceed until all of the styrene was consumed. Water (88 mL) and carbon dioxide were added to terminate the reaction. The final product had a styrene content of 31%, and an overall molecular weight of about 69,000.

Comparative polymer B (CP-B) was prepared essentially as described above, except a small amount of isoprene was charged at the end of the diene polymerization, in order to insure that all of the living chains terminated in isoprene repeat units. 60 kg of cyclohexane and 15.1 kg, of styrene were charged to a reactor. The reactor temperature was increased to about 40° C. Impurities were removed by adding small aliquots of s-butyllithium until the first evidence of color. 1000 mL of a solution of an approximately 12% wt solution of s-butyllithium in cyclohexane was added, and the styrene was allowed to complete polymerization at about 60° C. The molecular weight of the polystyrene produced in this reaction was determined to be 11,400 AMU by GPC. 291 kg of cyclohexane, 15 kg of butadiene and 15 kg of isoprene were added to a second reactor. The temperature was adjusted to about 60° C. and impurities were removed by adding small aliquots of s-butyllithium until the first evidence of color. 63 kg of the polystyryllithium solution produced in the first reactor was then transferred into the second reactor. The temperature was maintained at 60° C. After about 10 minutes, 15 kg of butadiene and 13.4 kg of isoprene were added at such a rate as to ensure that both monomers were added over the course of about 30 minutes. The reaction was allowed to proceed at 60° C. until the polymerization of both monomers was essentially complete, and then an additional 1.5 kg aliquot of isoprene was added. A sample collected at the end of the diene polymerization was analyzed by $^1$H NMR and GPC. The sample had a styrene content of 18.1% wt, 51% wt of the diene monomer was comprised of isoprene and the overall molecular weight was about 63,500. 12.4 kg of styrene was added, and the the reaction was allowed to proceed until all of the styrene was consumed. Water (88 mL) and carbon dioxide were added to terminate the reaction. The final product had a styrene content of 30.9%, and an overall molecular weight of about 75,900.

Polymer 1-1 was prepared by tetra-ethoxy silane coupling, as described below: First, the diblock polymer anion in which the diene block is comprised of a copolymer of budadiene and isoprene (50:50 wt:wt), S-Bd/Ip-Li, is prepared as follows 96 kg of cyclohexane and 24.1 kg, of styrene were charged to a reactor. The reactor temperature was increased to about 40° C. Impurities were removed by adding small aliquots of s-butyllithium until the first evidence of color. 1,570 mL of a solution of an approximately 12% wt solution of s-butyllithium in cyclohexane was added, and the styrene was allowed to complete polymerization at about 60° C. The molecular weight of the polystyrene produced in this reaction was determined to be 11,270 AMU by GPC. 170 kg of cyclohexane, 10.5 kg of butadiene and 10.5 kg of isoprene were added to a second reactor. The temperature was adjusted to about 60° C. and impurities were removed by adding small aliquots of s-butyllithium until the first evidence of color. 90.5 kg of the polystyryllithium solution produced in the first reactor was then transferred into the second reactor. The temperature was maintained at 60° C. After about 10 minutes, 10.5 kg of butadiene and 10.5 kg of isoprene were added, both at a rate of about 500 g/min. The reaction was allowed to proceed at 60° C. until the polymerization of both monomers was essentially complete. A sample collected at this point was analyzed by $^1$H NMR and GPC. The sample had a styrene content of 31% wt, 51% wt of the diene monomer was comprised of isoprene and the overall molecular weight was 36,400. 163.5 g of TEOS was added, and the coupling reaction was allowed to proceed for 60 minutes at 60° C. Water (88 mL) and carbon dioxide were added to terminate the reaction. The final product had a coupling efficiency of 93%, and 93% of the coupled species were linear, the remaining being 3-arm radial.

What is claimed is:

1. A process for making a hydrogenated block copolymer, comprising the steps of:
   a. reacting a living lithium-terminated polymer having the formula P-Li where P is a copolymer chain of one or more conjugated dienes having from 4 to 12 carbon atoms and one or more mono alkenyl arenes having from 8 to 18 carbon atoms with an alkoxy silane coupling agent having the formula $R_x$—Si—$(OR')_y$, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals, and where the molar ratio of Si to Li is from about 0.35 to about 0.7, thereby forming a coupled polymer;
   b. hydrogenating the coupled polymer under hydrogenation conditions to substantially saturate at least the olefinically derived double bonds of said coupled polymer without substantial degradation of the coupled polymer; and
   c. recovering the resulting hydrogenated polymer;
wherein the resulting hydrogenated block copolymer comprises a mixture of from 0 to 5 weight percent tetra-branched block copolymer, from 0 to 60 weight percent tri-branched block copolymer, from 40 to 95 weight percent di-branched block copolymer and from 2 to 10 weight percent linear diblock copolymer.

2. The process according to claim 1 wherein said conjugated diene is selected from the group consisting of butadiene and isoprene and said mono alkenyl arene is styrene.

3. The process according to claim 2 wherein P is a block copolymer of styrene and butadiene with the butadiene block being adjacent to the lithium ion.

4. The process according to claim 3 wherein the styrene block has an average molecular weight of from about 3,000 to about 60,000 and said butadiene block has an average molecular weight of from about 20,000 to about 200,000.

5. The process according to claim 3 wherein said alkoxy silane coupling agent is a tetra alkoxy silane where x is zero and R' is a linear or branched alkyl hydrocarbon radical having 1 to 12 carbon atoms.

6. The process according to claim 5 wherein said alkoxy silane coupling agent is tetramethoxy silane and wherein the coupled polymer is contacted with an alcohol prior to hydrogenation.

7. The process according to claim 6 wherein said alcohol is methanol and the molar ratio of methanol to Li is from 1 to 1.5 moles of methanol per mole of Li.

8. The process according to claim 5 wherein said alkoxy silane coupling agent is tetraethoxy silane.

9. The process according to claim 8 wherein the coupled polymer is contacted with an alcohol prior to hydrogenation.

10. The process according to claim 9 wherein said alcohol is methanol and the molar ratio of methanol to Li is from 0.05 to 0.5 moles of methanol per mole of Li.

11. The process according to claim 5 wherein said hydrogenation takes place at a temperature of between about 20° C. to about 60° C.

12. The process according to claim 11 wherein the catalyst used in the hydrogenation is selected from cobalt, nickel and titanium catalysts.

13. The process according to claim 12 wherein the coupled polymer is contacted with an alcohol prior to hydrogenation.

14. The process according to claim 3 wherein said alkoxy silane oupling agent is an alkyl trialkoxy silane.

15. The process according to claim 14 wherein said alkyl trialkoxy silane is methyl trimethoxy silane.

16. The process according to claim 15 wherein the coupled polymer is contacted with an alcohol prior to hydrogenation.

17. The process according to claim 16 wherein said alcohol is 2-ethyl hexanol and the molar ratio of alcohol to Li is from 0.05 to 0.5 moles of alcohol per mole of Li.

18. The process according to claim 3 wherein said alkoxy silane is an aryl trialkoxy silane.

19. The process according to claim 18 wherein said aryl trialkoxy silane is phenyl trimethoxy silane and the coupled polymer is contacted with an alcohol prior to hydrogenation.

20. The process according to claim 19 wherein said alcohol is 2-ethyl hexanol and the molar ratio of alcohol to Li is from 0.05 to 0.5 moles of alcohol per mole of Li.

21. The process according to claim 1 wherein the coupling efficiency is greater than 90%.

22. The process according to claim 1 wherein the molar ratio of Si to Li is from about 0.4 to about 0.55.

23. The polymer produced by the process of claim 7.

24. The polymer produced by the process of claim 10.

25. The polymer produced by the process of claim 17.

26. The process according to claim 2 wherein P is a block copolymer of styrene and isoprene with the isoprene black being adjacent to the lithium ion.

27. The process according to claim 26 wherein the styrene block has an average molecular weight of from about 3,000 to about 60,000 and said isoprene block has an average molecular weight of from about 20,000 to about 200,000.

28. The process according to claim 26 wherein the alkoxy silane coupling agent is selected from tetramethoxy silane, tetraethoxy silane, tetrabutoxy silane, tetrakis(2-etylhexyloxy)silane, methyl trimnethoxy silane, methyl triethoxy silane, isobutyl trimethoxy silane and phenyl trimethoxy silane.

29. The process according to claim 4 wherein the alkoxy silane coupling agent is selected from tetramethoxy silane, tetraethoxy silane, tetrabutoxy silane, tetrakis(2-ethylhexyloxy)silane, methyl trimethoxy silane, methyl triethoxy silane, isobutyl trimethoxy silane and phenyl trimethoxy silane.

* * * * *